June 7, 1966 R. L. TWEEDALE 3,254,481
LAWN MOWER WITH ORBITAL MOTION CUTTING BLADE
Filed Nov. 24, 1964

INVENTOR
RALPH L. TWEEDALE
BY Tweedale & Gerhardt
ATTORNEYS.

United States Patent Office 3,254,481
Patented June 7, 1966

3,254,481
LAWN MOWER WITH ORBITAL MOTION CUTTING BLADE
Ralph L. Tweedale, Southfield, Mich., assignor to Massey-Ferguson Inc., Detroit, Mich.
Filed Nov. 24, 1964, Ser. No. 413,412
6 Claims. (Cl. 56—25.4)

This invention relates generally to mowers, and more particularly to power mowers suitable for cutting upstanding stubble, turf, piles and the like and while useful for textile piles and the like will be described in connection with cutting grass on lawns, cemeteries, golf courses and the like.

Presently available power lawn mowers generally are of either the rotary or reel type, the former having one or more cutter bars rotatable about a vertical axis, and the latter including one or more cutter bars rotatable about a horizontal axis. In both types, the mower cutter bars are unprotected and are thus highly susceptible to damage from rocks and similar objects. Moreover, the high speed rotation of the unprotected cutter bars constitutes a hazard to the operator and other persons in the vicinity of the mower during operation. Severe injuries have been caused by rocks, nails and sticks thrown by the high speed cutter bars as well as by the operator accidentally coming in contact with the exposed cutter bars during operation.

Furthermore, the cutting efficiency of the rotary and reel type mowers depends both upon the speed and inertia of the rotating cutter bars and the position of the blades or stems of grass, weeds or other plants being mowed. If the blades of grass are not standing substantially perpendicularly with respect to the ground, uneven or incomplete cutting will result. Under some conditions, the cutter bars of the mower may merely push the grass aside without cutting the blades.

It is therefore an object of this invention to provide a power mower in which the cutting member is incapable of contacting and propelling rocks, sticks and similar objects.

A further object is to provide a power mower in which the grass, weeds and other plant growth being mowed is cut more efficiently by shearing action between coacting surfaces, and furthermore to subject each blade to a large number of shearing actions in succession to thus produce a smoother and more even "dress" to high grade turfs than has hitherto been possible in a single pass.

Another object lies in the provision of a mower which, during operation, creates a suction force tending to pull the blades or stems of grass, or other plant growth being mowed, into an upright position between coacting shearing surfaces so that the cuttnig will be at a uniform height.

Yet another object is to provide a mower in which the possibility of the moving blade coming into contact with rocks and similar objects is substantially eliminated and wherein the cutter is enclosed in such a manner as to substantially eliminate the possibility of the operator being accidentally injured by the blade during operation.

In carrying out the foregoing, and other objects, a mower embodying the present invention includes a housing having a top wall and depending side walls forming a peripheral skirt. Supported on the lower ends of the skirt is a guard plate provided throughout its entire area with a plurality of elongated slots arranged in a suitable pattern. Cooperating with the guard is a cutter of nearly coextensive area and having a grid work of cutter bars arranged for effective shearing with the side walls of the guide slots and distributed substantially over the full area of the guard. Shearing action is imparted by causing the cutter to move in an orbital but non-rotating motion through a circular orbit which causes the cutter bars to simultaneously shear grass blades or stems against the side of one or more elongated slots during each cycle. The orbital motion may be provided by a pair of rotary crank members driven in synchronism from a conventional motor. The basic cutting mechanism is in general, except for size, similar to that shown in my Patent 3,129,507, patented Apr. 19, 1964.

Interposed between the top wall of the housing and the upper surface of the cutter is one or more fan blades which are mounted on the crankshafts and are driven thereby to create a suction force through the slots of the guard plate which tends to pull the grass into the slots. The cut plant material is blown out of the housing by the fan blades, the housing being provided with one or more discharge outlets.

Other objects and advantages of the invention will become apparent from the following description taken in connection with the accompanying drawings in which.

Figure 1:
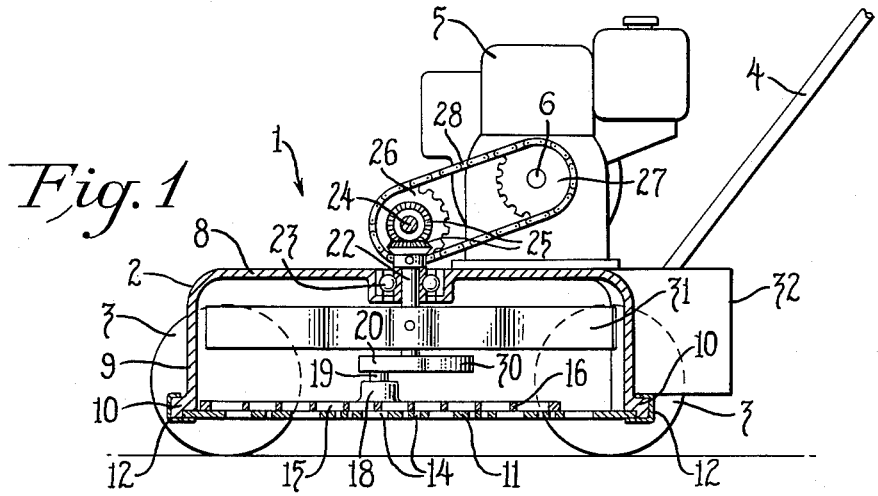
FIG. 1 is a sectional view of a mower embodying the invention in its preferred form.

While one specific embodiment of the invention will be described and illustrated in the foregoing specification and drawings, it should be understood that I do not intend to limit the invention to the exact construction shown. On the contrary, I intend to cover all alternatives, modifications and equivalents falling within the scope and spirit of the invention.

With reference to the drawings, the mower is collectively designated by reference numeral 1 and includes a housing or shield 2 supported on wheels 3. Mounted on housing 2 is a conventional handle 4 and a gasoline engine 5 having an output shaft 6. Housing 2 is provided with a top wall 8 and depending side walls defining a peripheral skirt 9. Formed at the bottom edge of side walls 9 is a laterally projecting flange 10 having a recess or shoulder at its inner periphery.

Seated in the peripheral shoulder of flange 10 is a guard plate 11 which is secured in position by a retainer 12 mounted on flange 10 of the housing. Guard plate 11 is formed with a plurality of slots 14 distributed throughout its area preferably in the pattern shown more clearly in FIG. 3. The retainer 12 may take the form of a band of channel shaped cross section having spaced ends which are removably secured to each other by a bolt, not shown, after the manner of a hose clamp.

Supported on the upper surface of guard plate 11 within housing 2 is a cutter plate 15 made up of grid work of non-parallel cutter bars 16. The area of cutter plate 15 is somewhat less than that of guard plate 11 as shown in FIG. 2 permitting the cutter plate to move across the upper surface of guard plate 11 and sweep across slots 14 with each cycle of movement.

Projecting from the upper surface of cutter plate 15 is a pair of bosses or journal bearings 18 each of which rotatably receives a crank pin 19 depending from one of a pair of cranks 20. Each crank 20 is non-rotatably mounted on the lower end of one of a pair of shafts 22 which in turn are rotatably supported in top wall 8 of housing 2 by bearings 23 (FIG. 1). Cranks 20 project laterally from shafts 22 in parallel relationship with each other.

Figure 2:
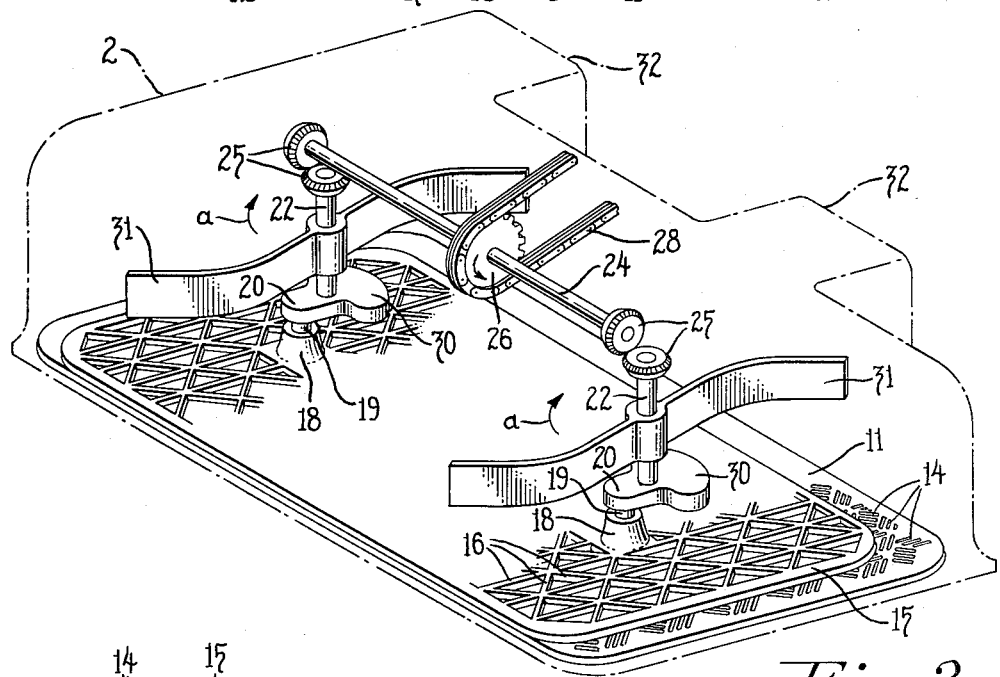
FIG. 2 is a perspective view of the mower of FIG. 1 with some of the parts being omitted for clarity of illustration.

Crankshafts 22 are driven by a drive shaft 24 coupled to crankshafts 22 by means of coacting bevel gears 25 as shown in FIG. 2. Drive shaft 24 is coupled to the output shaft of engine 5 by means of sprockets 26 and 27 on shafts 24 and 6, respectively, on which is mounted a conventional drive chain 28.

As shown in FIG. 2, crank pins 19 are eccentrically disposed with the axes of rotation of their associated crankshafts 22 by means of cranks 20, and accordingly a counterweight 30 is formed on cranks 20 on the opposite sides of their shafts 22 from crank pins 19 to counteract the effect of the moments generated by the orbital path of cutter plate 15.

When the gasoline engine 5 is running, shafts 22 each rotate in the direction of arrows *a* in FIG. 2 to cause cutter plate 15 to move in an orbital path about the axes of shafts 22 with the size of plate 15 being such that the full area of guard plate 11 is swept by the cutter plate during each revolution of shafts 22. Thus, as the mower moves toward the left as viewed in FIG. 1, grass blades or the stems of other plants are received in slots 14 of guard plate 11 where they will be sheared between the cutter bars 16 and the edges of slots 14 as the cutter bars pass over the slots 14 as shown in FIG. 3.

In order to remove the cut crop material from within the housing 2 as well as to cause the grass to stand in an upright position with respect to the ground as the mower passes thereover, a blade 31 is fixed to each of shafts 22 for creating a suction force through slots 14 of the guard plate 11. Moreover, a pair of discharge outlets 32 are formed in the rear of housing 2 through which the cut crop material is blown by fan blades 31. Thus, as the cutter plate 15 moves orbitally about the parallel axes of shafts 22, fan blades 31 create a suction force through slots 14 of the guard plate to pull the plant growth beneath the mower to a substantially upright position to be sheared off by the coacting surfaces between the edges of slots 14 and the cutter bars 16 which are in close mating contact with each other, the fans further directing a stream of air through discharge openings 32 to expel the cut plant material from housing 2.

Figure 3:
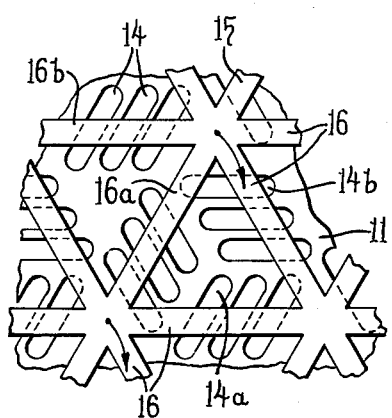
FIG. 3 is an enlarged detail of the guard plate and cutter bars of the mower of FIG. 1.

The pattern of slots in guard plate 11 and of the cutter bars in cutter plate 15 may take a variety of forms, a suitable form being illustrated in FIG. 3. In the latter figure, slots 14 are arranged in three groups of three distributed over a hexagonal area and this pattern is repeated over the entire work area of the surface of guard plate 11. Cutter 15 is formed as a grid work of bars 16 arranged in three directions 60 degrees apart to form equilateral triangular-shaped openings or spaces therebetween. The spacing of bars 16 and the throw of cranks 20 are so chosen with respect to the size of the hexagonal pattern or slots 14 that each group of three slots will be swept by a cutter bar 16 which is parallel to the orientation of the slot group one or more times during each cycle of orbital movement of cutter 15.

Thus, as cutter 15 moves in the direction of the arrows shown in FIG. 3, the bar 16*a* will have shearing engagement with the long edges of the slot 14*a* with which it remains parallel at all times. The bar 16*b* will likewise shear with the edges of slots 14*b* and bar 16 with the slots 14. Other patterns of non-parallel slots 14 and corresponding cutter bar grids may be utilized based upon squares, pentagons and other regular or irregular figures. The throw of cranks 20 should be equal to the pitch of the parallel cutter bars, or a multiple thereof, plus a small allowance.

In the event of the housing becoming clogged with wet grass, the retainer band 12 may be readily removed permitting the guard 11 and cutter 15 to be taken off for access to the interior of the housing 2.

While a preferred form of the present invention has been illustrated and described, it will be understood that other forms may be adopted all coming within the scope and spirit of the invention as defined by the following claims.

I claim:

1. A mower including a housing having a top wall and a depending, peripheral skirt, a guard plate supported on said skirt and spaced vertically beneath said top wall, ground support means for supporting said housing on the ground with said guard plate spaced above the ground in substantially parallel relationship therewith, a plurality of openings in said guard plate for receiving stems of grass and other plant growth within said housing between said top wall and guard plate, and a cutter in the form of a plate-like member supported in said housing in close, mating relationship with the upper surface of said guard plate and having an area less than the area of the guard plate, said cutter being supported for cyclical movement along the upper surface of said guard plate and being made up of a grid work of cutter bars operable during said cyclical movement to sweep across said openings and shear the plant material projecting through said openings, said cutter bars intersecting each other to define the peripheries of a plurality of substantially equilateral triangular-shaped openings in said cutter of larger area than the openings in said guard plate with the portion of each of said cutter bars forming said triangular openings sweeping across at least one of the guard plate openings during each cycle of movement of the cutter, and at least one fan blade supported in said housing rotatable to create a suction force through the openings in said guard plate tending to urge the plant stems to project into said openings.

2. A mower as defined in claim 1 further including a pair of shafts rotatably journalled in said housing, a pair of crank arms carried by each of said shafts and extending perpendicularly therefrom in parallel relationship with respect to each other, means pivotally connecting said crank arms with said cutter, and means for simultaneously driving said shafts to cause said cutter to move in an orbital path about the axes of said shafts to sweep across the entire area of said guard plate during each revolution of said shafts.

3. A mower as defined in claim 2 further including a fan blade mounted on each of said shafts for rotation therewith operable to create a suction force through the openings tending to urge grass and other plant growth into said openings.

4. A mower as defined in claim 3 further including at least one discharge opening in said housing through which said fan blades direct a stream of air to expel the cut plant material from within said housing.

5. A mower comprising a housing having a substantially vertical, peripheral skirt; means for supporting said housing on the ground with said guard plate spaced above the ground in substantial parallel relationship therewith; a substantially horizontal guard plate supported at its periphery on said skirt and having a plurality of plant receiving openings, uniformly distributed throughout the area thereof; a cutter plate supported in said housing in close, face to face relationship with said guard plate and having a plurality of openings formed therein throughout its area, the peripheries of which form cutting edges, said openings in said cutter plate being larger than the openings in said guard plate, the area of said cutter plate being less than that of said guard plate; a plurality of shafts rotatably journalled in said housing; a crank arm carried by each of said shafts and extending perpendicularly therefrom in substantial parallel relationship with respect to each other; means pivotally connecting said crank arms with said cutter; means for simultaneously driving said shafts to cause said cutter to move in an orbital path about the axes of said shafts to sweep across the entire area of said guard plate during each revolution of said shafts; and fan means mounted in said housing operable to create a suction force through the openings tending to urge plants into said openings; and at least one discharge opening in said housing through which said fan means directs a stream of air to expel the cut plant material from within said housing.

6. A mower having a housing with means for supporting the mower for movement over the ground comprising a guard plate perforated with plant receiving openings throughout its area, a cutter comprising a mating plate formed with a grid work of cutter bars which intersect each other to define the peripheries of a plurality of substantially equilateral triangular-shaped openings in said cutter of larger area than the openings in said guard plate, means for moving the cutter plate over the surface of the guard plate in close face to face relationship therewith such that the portion of each of said cutter bars forming said triangular openings sweep across at least one of the guard plate openings during each cycle of movement of the cutter to shear plant material received in the guard plate openings, and means for establishing a current of air upwardly through the plates for pulling the tops of plants into the openings of the plates.

References Cited by the Examiner

UNITED STATES PATENTS

| | | | |
|---|---|---|---|
| 512,009 | 1/1894 | Chaney | 30—133 |
| 1,730,889 | 10/1929 | Hoberecht | 30—133 |
| 1,880,154 | 9/1932 | Rotondo et al. | 56—25.4 |
| 2,323,881 | 7/1943 | Mehl | 30—354 |
| 2,547,328 | 4/1951 | Koch et al. | 56—25.4 |
| 2,716,278 | 8/1955 | Thompson | 30—41.6 |
| 3,129,507 | 4/1964 | Tweedale | 30—354 |

ABRAHAM G. STONE, *Primary Examiner.*

J. O. BOLT, *Assistant Examiner.*